(12) United States Patent
Yamamoto et al.

(10) Patent No.: US 8,243,577 B2
(45) Date of Patent: Aug. 14, 2012

(54) OPTICAL INFORMATION RECORDING MEDIUM, REPRODUCING DEVICE FOR OPTICAL INFORMATION RECORDING MEDIUM, AND REPRODUCING METHOD FOR OPTICAL INFORMATION RECORDING MEDIUM

(75) Inventors: Masaki Yamamoto, Nara (JP); Hirohisa Yamada, Tenri (JP); Toshihiko Sakai, Nara (JP); Yasuhiro Harada, Nara (JP); Go Mori, Nara (JP); Hideharu Tajima, Nara (JP); Masanori Shimo, Gose (JP); Nobuyuki Takamori, Nara (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 252 days.

(21) Appl. No.: 12/375,167

(22) PCT Filed: Jul. 24, 2007

(86) PCT No.: PCT/JP2007/064495
§ 371 (c)(1), (2), (4) Date: Jan. 26, 2009

(87) PCT Pub. No.: WO2008/013168
PCT Pub. Date: Jan. 31, 2008

(65) Prior Publication Data
US 2010/0014407 A1    Jan. 21, 2010

(30) Foreign Application Priority Data
Jul. 27, 2006    (JP) ................................ 2006-205160

(51) Int. Cl.
*G11B 7/24* (2006.01)

(52) U.S. Cl. .................. 369/275.1; 369/275.4; 369/283; 369/284

(58) Field of Classification Search ........................ None
See application file for complete search history.

(56) References Cited

U.S. PATENT DOCUMENTS

| | | | |
|---|---|---|---|
| 5,168,482 A | | 12/1992 | Aratani et al. |
| 5,559,786 A | * | 9/1996 | Horimai et al. ............ 369/275.1 |
| 5,673,250 A | | 9/1997 | Mieda et al. |
| 6,058,100 A | | 5/2000 | Mieda et al. |
| 6,252,845 B1 | | 6/2001 | Hino et al. |
| 6,965,556 B1 | | 11/2005 | Kikukawa et al. |
| 2001/0026505 A1 | | 10/2001 | Hino et al. |
| 2004/0187145 A1 | * | 9/2004 | Tanaka et al. ................. 720/718 |
| 2004/0253539 A1 | | 12/2004 | Uno et al. |

(Continued)

FOREIGN PATENT DOCUMENTS

JP         3-93058 A      4/1991

(Continued)

*Primary Examiner* — Lixi C Simpson
(74) *Attorney, Agent, or Firm* — Edwards Wildman Palmer LLP; David G. Conlin; Edmund Koundakjian

(57) ABSTRACT

In an optical information recording medium (1), a light-transmitting layer (10) or a transparent substrate, an information recording layer (20), and a substrate (30) are stacked in this order from a side from which reproducing light (2) enters. The information recording layer (20) includes at least a reproducing film (21) whose complex refractive index at a light source wavelength (λ) of the reproducing light (2) is changed by heat. The relationship of $0.67 \times (\lambda/NA) > TP > 0.04 \times (\lambda/NA)$ is satisfied, where TP is a track pitch of prepits (31) formed on the substrate (30), and NA is a numerical aperture of an objective lens (55) for converging the reproducing light (2) on the optical information recording medium.

5 Claims, 4 Drawing Sheets

U.S. PATENT DOCUMENTS

| | | |
|---|---|---|
| 2004/0264355 A1 | 12/2004 | Takamori et al. |
| 2005/0007937 A1 | 1/2005 | Mori et al. |
| 2005/0117505 A1 | 6/2005 | Takamori et al. |
| 2005/0221049 A1 | 10/2005 | Inoue et al. |
| 2005/0237912 A1 | 10/2005 | Kikukawa et al. |
| 2006/0028974 A1 | 2/2006 | Mori et al. |
| 2006/0040088 A1* | 2/2006 | Hirotsune et al. ............ 428/64.4 |
| 2006/0046013 A1* | 3/2006 | Bae et al. ..................... 428/64.4 |
| 2006/0087959 A1* | 4/2006 | Adachi et al. ............. 369/275.1 |
| 2006/0192017 A1 | 8/2006 | Tajima et al. |
| 2006/0203696 A1 | 9/2006 | Mori et al. |
| 2007/0274186 A1* | 11/2007 | Maeda ...................... 369/59.11 |

FOREIGN PATENT DOCUMENTS

| | | |
|---|---|---|
| JP | 7-57327 A | 3/1995 |
| JP | 8-022621 A | 1/1996 |
| JP | 11-126376 A | 5/1999 |
| JP | 2001-250274 A | 9/2001 |
| JP | 2004-111004 A | 4/2004 |
| JP | 2004-220747 A | 8/2004 |
| JP | 2005-18964 | 9/2005 |
| JP | 2006-73169 A | 3/2006 |
| JP | 2006-134519 A | 5/2006 |
| JP | 2006-269040 A | 10/2006 |
| JP | 2006-277918 A | 10/2006 |
| JP | 2006-302494 A | 11/2006 |
| JP | 2007-12146 A | 1/2007 |
| TW | 200506926 | 2/2005 |
| WO | WO-03/075268 A1 | 9/2003 |

* cited by examiner

OPTICAL INFORMATION RECORDING MEDIUM, REPRODUCING DEVICE FOR OPTICAL INFORMATION RECORDING MEDIUM, AND REPRODUCING METHOD FOR OPTICAL INFORMATION RECORDING MEDIUM

TECHNICAL FIELD

The present invention relates to (i) an optical information recording medium from which information is reproduced in response to a light beam irradiated onto the optical information recording medium, (ii) a reproducing device for the optical recording medium, and (iii) a reproducing method for the optical recording medium.

BACKGROUND ART

With the advance of information technology, information-communication technology, and multimedia technology in recent years, there has generally been an increasing need for an optical information recording medium having a higher density and a higher capacity. An upper limit of a recording density of the optical information recording medium is mainly determined by a diameter of a spot of a light beam for reproducing information.

The diameter of the spot of the light beam is approximately expressed by $\lambda/NA$, where $\lambda$ is a light source wavelength of reproducing light and NA is a numerical aperture of an objective lens for determining the diameter of the spot of the light beam. It is possible to improve the recording density of the optical information recording medium by reducing the diameter of the spot of the light beam.

However, it is considered that reduction in the light source wavelength $\lambda$ of the reproducing light is limited to a wavelength of ultraviolet light, due to (i) absorption by an optical element and (ii) restriction given by a sensitivity property of a detector.

Further, an improvement of the NA is substantially limited by an allowance of inclination of the optical information recording medium. Therefore, there is a limit on an improvement in the recording density of the optical information recording medium by reduction of the diameter of the spot of the light beam.

As a technique for overcoming these limits, a super-resolution reproducing technique is generally known. The super-resolution reproducing technique is a technique for reproducing a signal having a mark length shorter than an optical resolution limit (i.e., a mark length of approximately $\lambda/(4NA)$, which is a length one-fourth of a diameter of a light spot) of a reproducing device. This technique allows an even shorter mark length to be recorded on an optical information recording medium. This improves a recording density of an optical information recording medium.

Patent Document 1 discloses a super-resolution optical information recording medium, which is called Super-ROM. The super-resolution optical information recording medium uses a high-resolution technique using a prepit, which makes a protrusion/depression pattern and contributes to a reproduction of information. At the present time, detail of a mechanism of how a reproduction is carried out by the super-resolution optical information recording medium disclosed in Patent Document 1 has still not been elucidated.

However, in a case where a reflecting film of a reproduction-dedicated disc is made of material such as Mo, W, Si, and Ge, instead of a conventionally-used reflecting film made of Al or Au, it is possible to reproduce a signal having a short recording pit length which is an optical resolution limit of a conventional optical system.

Patent Document 2 discloses a super-resolution reproducing method available to a rewritable magneto-optical recording medium. However, this super-resolution reproducing method is not available to a reproduction-dedicated optical information recording medium. The reproduction-dedicated optical information recording medium stores information which is not rewritable due to a protrusion/depression pattern formed on a substrate.

In the super-resolution reproducing method disclosed in Patent Document 2, a reproducing layer is formed on a record holding layer. In a reproduction of a signal, a signal recorded on the record holding layer is transferred to the reproducing layer only in an area whose temperature exceeds a certain value, that is, an area which is inside a spot of a light beam for a reproduction. This allows for a reproduction of a signal having a recording mark length shorter than an optical resolution limit. This improves (i) a linear recording density along a scanning direction with respect to a recording track and (ii) a track density which is determined by a gap (a track pitch) between tracks adjacent to each other and which is in a direction perpendicular to the scanning direction.

Although the conventional technique disclosed in Patent Document 1 allows for the reproduction of the signal having the recording pit length shorter than the optical resolution limit and therefore improves the linear recording density, this technique has a limit on the improvement in the linear recording density.

If the technique disclosed in Patent Document 1 improved the track density, the technique could provide a higher track density. Actually, however, it is impossible for the technique disclosed in Patent Document 1 to improve the track density because this technique does not improve signal leakage to a target recording track from a recording track adjacent to the target recording track, that is, crosstalk. The track density is determined mainly by the crosstalk.

Further, the layer which contributes to the super-resolution reproduction has some tens nm, that is, the layer is thin. Due to this, it is impossible for the layer to have sufficient reproduction durability. However, the thinner the layer contributing to the super-resolution reproduction is, the greater the effect obtained by the high-resolution reproduction becomes. That is, in the case where the layer contributing to the super-resolution reproduction is made thinner for the purpose of obtaining a greater effect of the high-resolution reproduction, such a problem occurs that the reproduction durability of the layer is reduced.

Further, the conventional technique disclosed in Patent Document 2 is the super-resolution reproducing technique for a magneto-optical recording/reproducing method. That is, although this technique improves both of the linear recording density and the track density, this technique is available only to the magneto-optical recording/reproducing method.

Therefore, it is impossible for the conventional technique of Patent Document 2 to carry out a reproduction of other methods, such as the reproduction-dedicated optical information recording medium, on which recording information cannot be rewritten due to the protrusion/depression pattern formed on the substrate. The reproduction-dedicated optical information recording medium is considered to be important to make a drive widely used.

In the technique disclosed in Patent Document 2, a reproducing film itself directly absorbs light and thereby generates heat so as to allow for the super-resolution reproduction. With this, material of the reproducing layer is likely to be subjected to a greater load. This causes such a problem that sufficient reproduction durability is not attained by the reproducing film.

Furthermore, a phase-change film, a dye film, or the like may also be used as a conventional super-resolution film. However, such a super-resolution film directly absorbs light or heat, so that the super-resolution film changes its composition or its phase. With this, material of the super-resolution film is likely to be subjected to a greater load. This causes such a problem that sufficient reproduction durability is not attained by the conventional super-resolution film.

Moreover, the phase-change film and the dye film are more expensive than film material generally used for an optical information recording medium. This causes such a problem that a super-resolution medium is more expensive than a conventional optical information recording medium.

As described above, the conventional super-resolution reproducing techniques have a lot of problems.

[Patent Document 1]

Japanese Unexamined Patent Application Publication, Tokukai, No. 2001-250274 (published on Sep. 14, 2001)

[Patent Document 2]

Japanese Unexamined Patent Application Publication, Tokukaihei, No. 3-93058 (published on Apr. 18, 1991)

DISCLOSURE OF INVENTION

The present invention was made in view of the foregoing problems, and an object of the present invention is to provide: (i) an optical information recording medium (a) which is capable of reproducing high-density recording information by improving a linear recording density and a track density and (b) which is excellent in reproduction durability; (ii) a recording/reproduction device of the optical information recording medium; and (iii) a reproducing method of the optical information recording medium.

In order to solve the foregoing problems, an optical information recording medium according to the present invention is arranged so as to be an optical information recording medium in which information has been recorded and from which the information is reproduced in response to reproducing light irradiated onto the optical information recording medium, the optical information recording medium, including: a light-transmitting layer or a transparent substrate; an information recording layer; and a substrate, the light-transmitting layer or the transparent substrate, the information recording layer, and the substrate being stacked in this order from a side from which the reproducing light enters, the information recording layer including at least a reproducing film whose complex refractive index at a light source wavelength $\lambda$ of the reproducing light is changed by heat, and the following relationship being satisfied:

$$0.67 \times (\lambda/NA) > TP > 0.04 \times (\lambda/NA),$$

where TP is a track pitch of a recording track formed on the substrate and NA is a numerical aperture of an objective lens for converging the reproducing light onto the optical information recording medium.

With this, when the reproducing light enters the reproducing film whose complex refractive index at the light source wavelength $\lambda$ of the reproducing light is changed by the heat, the reproducing film itself or a layer (e.g., a light-absorbing film) which is adjacent to the reproducing film absorbs a part of the reproducing light and converts the part of the reproducing light into heat.

The reproducing film is heated by the heat thus converted, so that temperature distribution is provided to the inside of a light spot on the reproducing film. It is considered that a recording mark having a mark length equal to or shorter than an optical resolution limit is reproduced as follows: (i) In accordance with the temperature distribution, optical constants n and k of the reproducing film are changed. (ii) This increases or decreases a reflection rate inside the high-temperature area. (iii) Thereby, the spot of the reproducing light is reduced in a pseudo manner.

Thus, with the information recording layer including the reproducing film whose complex refractive index at the light source wavelength $\lambda$ of the reproducing light is changed by the heat, it is possible to increase a linear recording density. Further, it is also possible to improve crosstalk in a direction perpendicular to a scanning direction, because the spot of the reproducing light is reduced in the pseudo manner as described above.

Furthermore, according to an experiment, it has been confirmed that reproduction durability is improved in the optical information recording medium including the reproducing film whose complex refractive index at the light source wavelength $\lambda$ of the reproducing light is changed by the heat. That is, with the reproducing film whose complex refractive index at the light source wavelength $\lambda$ of the reproducing light is changed by the heat, it is possible to provide an optical information recording medium which is excellent in reproduction durability.

Moreover, with the information recording layer including the reproducing film, it is possible to improve the crosstalk. This allows a track pitch to be reduced.

Specifically, the present invention allows the track pitch to be reduced to less than $0.67 \times (\lambda/NA)$, which is a limit of a track pitch of a conventional technique, thereby allowing a gap between tracks to become narrower than that of the conventional technique. Therefore, the present invention attains an increased track density, which is not achieved by the super-resolution media according to Patent Document 1 and the like. Thus, the present invention provides an optical information recording medium having a higher density.

That is, the present invention increases the track density, as well as the linear recording density. This makes it possible for the present invention to attain a high-density recording capacity, which is not achieved by an optical information recording medium using the conventional super-resolution technique.

There is a case where (i) an improved amount of crosstalk occurring from a recording track inwardly adjacent to a target recording track on the optical information recording medium differs from (ii) an improved amount of crosstalk occurring from a recording track outwardly adjacent to the target recording track on the optical information recording medium. This difference is caused by, for example, the following reason. Because the optical information recording medium is rotating during a reproduction, the center of the spot of the reproducing light which spot is reduced in the pseudo manner is not coincident with the center of the reproducing light. In order to deal with this, by setting the track pitch so that the relationship "$TP > 0.04 \times (\lambda/NA)$" is satisfied as described above, it is possible to equalize (i) the improved amount of the crosstalk occurring from the recording track inwardly adjacent to the target recording track with (ii) the improved amount of the crosstalk occurring from the recording track outwardly adjacent to the target recording track. This further improves the crosstalk and increases the track density.

Further, an optical information recording medium according to the present invention is arranged so as to be an optical information recording medium in which information has been recorded and from which the information is reproduced in response to reproducing light irradiated onto the optical information recording medium, the optical information recording medium, including: a light-transmitting layer or a transparent substrate; an information recording layer; and a substrate, the light-transmitting layer or the transparent substrate, the information recording layer, and the substrate being stacked in this order from a side from which the reproducing light enters, and the information recording layer including at least a reproducing film mainly made of a metal oxide, and the following relationship being satisfied:

$$0.67 \times (\lambda/NA) > TP > 0.04 \times (\lambda/NA),$$

where TP is a track pitch of a recording track formed on the substrate and NA is a numerical aperture of an objective lens for converging the reproducing light on the optical information recording medium.

With the information recording layer including at least the reproducing film mainly made of the metal oxide, it is possible to improve (i) the linear recording density and (ii) the crosstalk in the direction perpendicular to the scanning direction. This allows the gap between the tracks to be reduced. This makes it possible for the present invention to attain an increased track density, which is not achieved by the super-resolution media according to Patent Document 1 and the like. Thereby, the present invention provides an optical information recording medium having a higher density.

That is, it is possible for the present invention to increase the track density, as well as the linear recording density. This makes it possible for the present invention to attain a higher-density recording capacity, which is not achieved by the optical information recording medium using the conventional super-resolution technique.

Further, the optical information recording medium using the reproducing film mainly made of the metal oxide exhibits good reproduction durability. This is because that the metal oxide is chemically stable, and therefore is not easily damaged by the incidence of the reproducing light. This makes it possible for the present invention to provide an optical information recording medium whose reproduction durability is improved compared with the optical information recording media disclosed in Patent Document 1 and Patent Document 2.

Furthermore, it is possible to form the reproducing film mainly made of the metal oxide by means of a vapor deposition method or a sputtering method. That is, it is relatively easy to form the reproducing film mainly made of the metal oxide.

Moreover, it is possible to collect the metal oxide as metal by deoxidizing the metal oxide. This improves recyclability of an optical information recording medium.

In a reproducing device for reproducing the optical information recording medium according to the present invention, a reproduction is carried out such that a center of reproducing light is shifted from a center of a recording track by an amount which is more than $0.02 \times (\lambda/NA)$ but less than TP/4.

This makes it possible to equalize (i) a crosstalk amount with respect to a track inwardly adjacent to a target track on the optical information recording medium with (ii) a crosstalk amount with respect to a track outwardly adjacent to the target track on the optical information recording medium, during the reproduction of the optical information recording medium. This further improves track density, thereby making it possible to provide a reproducing device for an optical information recording medium having a high density.

In a reproducing method of reproducing the optical information recording medium according to the present invention, a reproduction is carried out such that a center of reproducing light is shifted from a center of a recording track by an amount which is more than $0.02 \times (\lambda/NA)$ but less than TP/4.

This makes it possible to equalize (i) a crosstalk amount with respect to a track inwardly adjacent to a target track on the optical information recording medium with (ii) a crosstalk amount with respect to a track outwardly adjacent to the target track on the optical information recording medium, during the reproduction of the optical information recording medium. This further improves track density, thereby making it possible to provide a reproducing method for an optical information recording medium having a high density.

Figure 4:
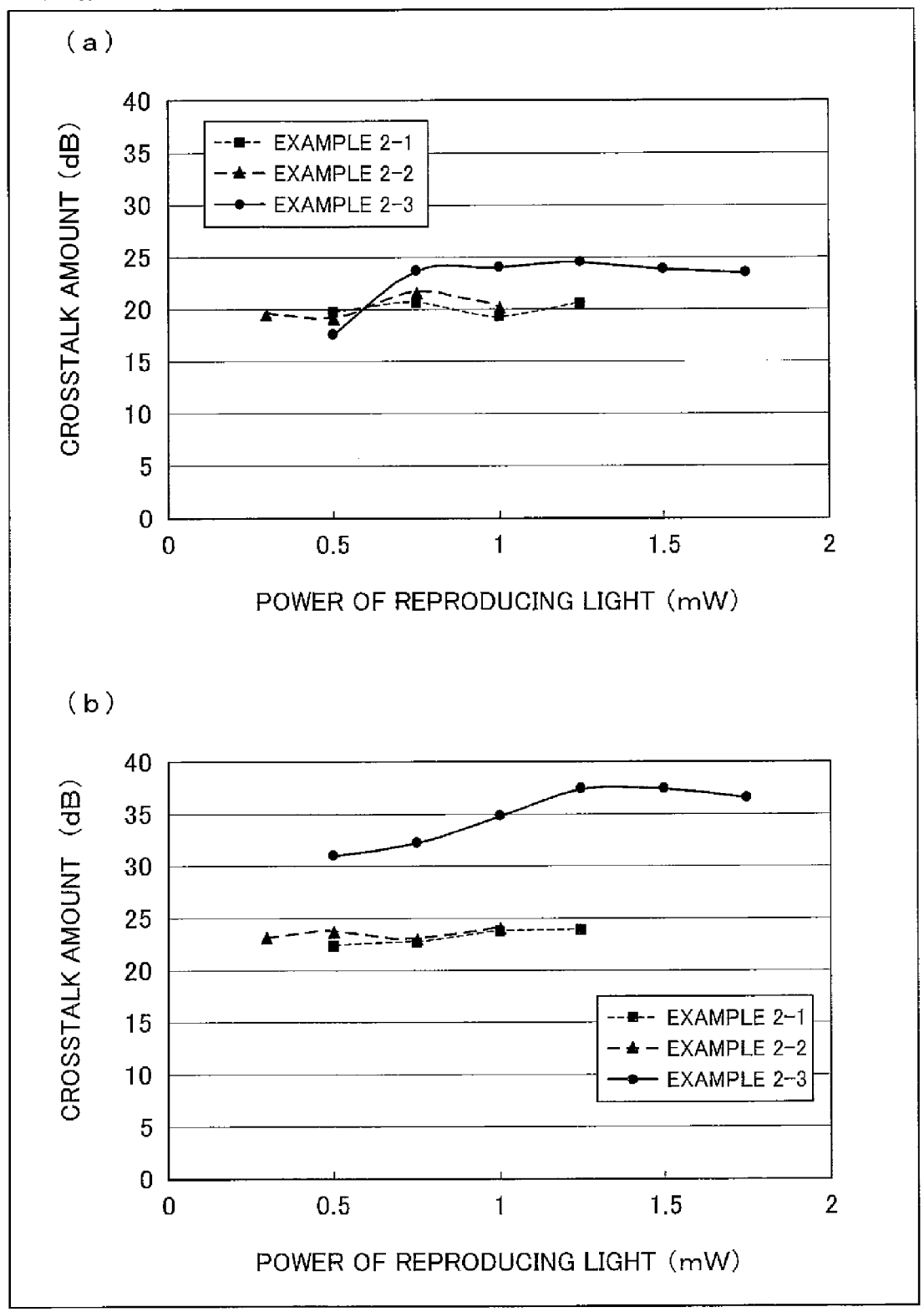

(a) of FIG. 4 is a characteristic diagram illustrating how much a crosstalk amount with respect to a recording track inwardly adjacent to a target recording track depends on power of reproducing light in Example 2-1, Example 2-2, and Example 2-3.

(b) of FIG. 4 is a characteristic diagram illustrating how much a crosstalk amount with respect to a recording track outwardly adjacent to the target recording track depends on the power of the reproducing light in Example 2-1, Example 2-2, and Example 2-3.

Figure 5:
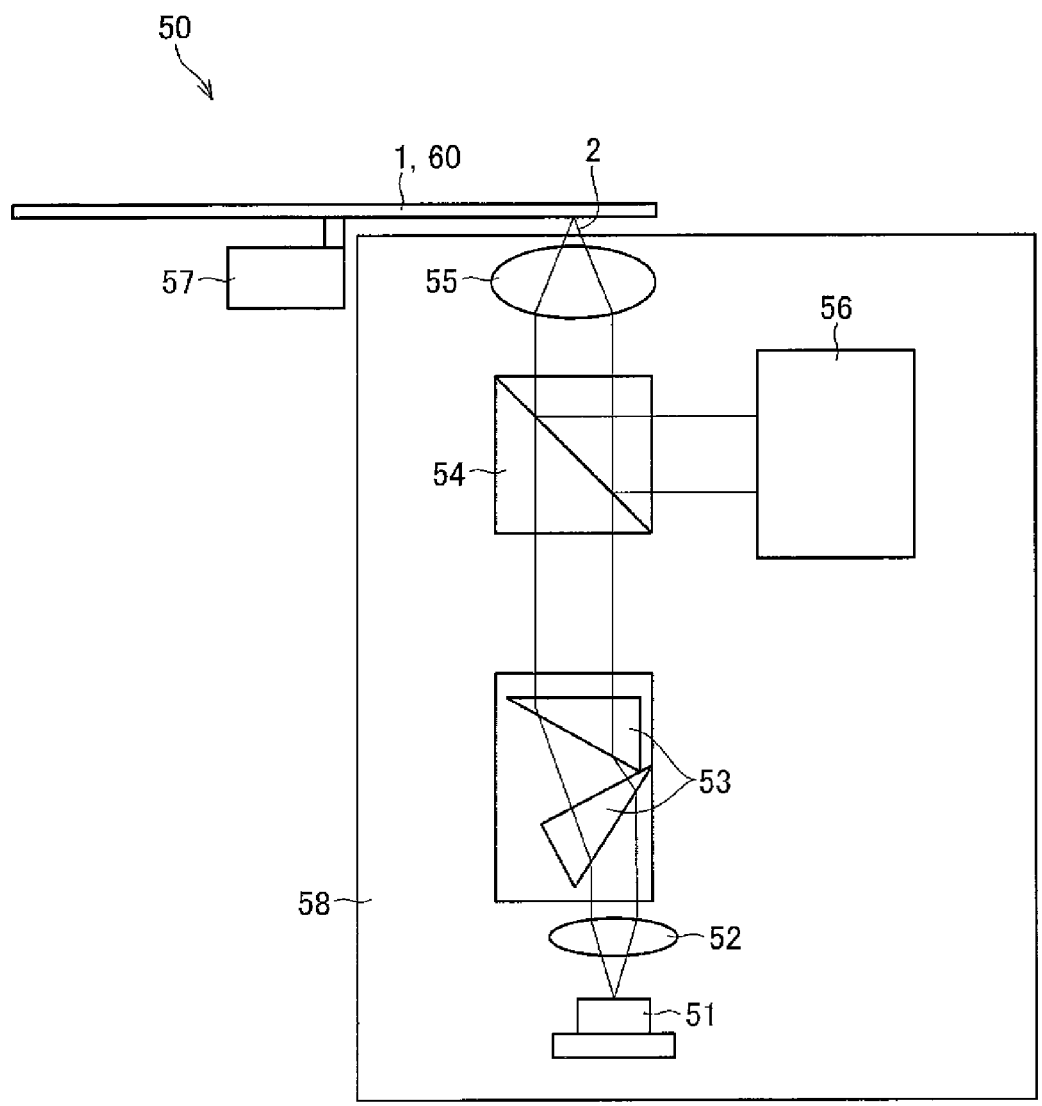

FIG. 5 is a block diagram schematically illustrating a reproducing device which is capable of reproducing the optical information recording medium.

EXPLANATION OF REFERENCE NUMERALS

1: Optical information recording medium
10: Light-transmitting layer
20: Information recording layer
21: Reproducing film
22: Light-absorbing film
30: Substrate
31: Prepit
50: Optical information recording medium reproducing device (Reproducing device)
51: Semiconductor laser (Laser light emitting means)
52: Collimating lens (Light-converging optical means)
53: Beam shaping prism (Light-converging optical means)
54: Beam splitter (Light-converging optical means)
55: Objective lens (Light-converging optical means)
56: Detection optical system (Photoelectric conversion means)
57: Spindle motor
58: Optical head
60: Optical information recording medium

BEST MODE FOR CARRYING OUT THE INVENTION

[First Embodiment]

One embodiment of the present invention is described below with reference to FIG. 1 and FIG. 2.

Figure 1:
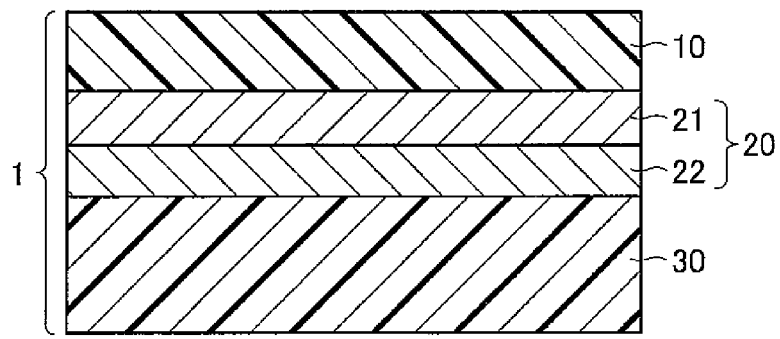
FIG. 1 is a cross-section view of a part of an optical information recording medium according to one embodiment of the present invention.

FIG. 1 is a cross-section view of an optical information recording medium 1.

As shown in FIG. 1, the optical information recording medium 1 includes: a substrate 30; an information recording layer 20 formed on the substrate 30; and a light-transmitting layer 10 formed on the information recording layer 20. The information recording layer 20 includes a light-absorbing film 22 and a reproducing film 21.

Reproducing light 2 for reading out information stored in the optical information recording medium 1 of the present embodiment enters from the light-transmitting layer 10 side. That is, a surface of the light-transmitting layer 10 is a light incident surface.

Material of the light-transmitting layer 10 is not particularly limited, but only needs to transmit the reproducing light 2 sufficiently. Further, the number of layers included in the light-transmitting layer 10 is not particularly limited. For example, the light-transmitting layer 10 may be arranged so as to have (i) a double-layer arrangement constituted by a polycarbonate film and a transparent adhesive resin layer or (ii) a single-layer arrangement using material such as an ultraviolet-curing resin.

Further, the light incident surface, which is the surface of the light-transmitting layer 10, may be provided with a protection film (such as hard-coating) thereon. Furthermore, the light-transmitting layer 10 may be a transparent substrate. Moreover, a thickness of the light-transmitting layer 10 is determined depending on an optical system which emits the reproducing light 2. Next, the following describes the reproducing film 21.

The reproducing film 21 is a film for producing a super-resolution effect. In the reproducing film 21, a complex refractive index at a light source wavelength $\lambda$ of the reproducing light 2 is changed by heat. The reproducing film 21 is made of material capable of producing this effect.

The material of the reproducing film 21 may preferably be a metal oxide because of the following reasons: (i) the metal oxide is excellent in durability; (ii) the metal oxide is relatively easy to be processed for manufacturing the reproducing film 21; and the like. Examples of the metal oxide may encompass a zinc oxide, a tin oxide, an indium oxide, a nickel oxide, a vanadium oxide, a titanium oxide, a cerium oxide, a strontium titanate, a cobalt oxide, and a tantalum oxide.

Particularly, it is more preferable that the reproducing film 21 is made of the zinc oxide. This is because of the following reasons: (i) the zinc oxide provides a most preferable super-resolution characteristic; (ii) the zinc oxide is excellent in durability; (iii) the zinc oxide provides good reversibility of a complex refractive index change depending on temperature; (iv) the zinc oxide is available at a relatively low price; and the like.

A thickness of the reproducing film 21 is not particularly limited. The thickness of the reproducing film 21 may be adjusted in accordance with the material to be used. However, the thickness of the reproducing film 21 may preferably in a range from approximately 5 nm to approximately 800 nm.

Next, the light-absorbing film 22 is described.

The light-absorbing film 22 absorbs the reproducing light 2 so as to increase a temperature of the light-absorbing film 22. Then, the light-absorbing film 22 transmits the heat to the reproducing film 21 so as to increase a temperature of the reproducing film 21.

In other words, the reproducing light 2 irradiated onto the information recording layer 20 is absorbed mainly by the light-absorbing film 22. Thereby, the reproducing light 2 is converted into heat. The heat thus converted is efficiently transmitted to the reproducing film. Compared with a case where the light-absorbing film 22 is not provided, the information recording layer 20 including the light-absorbing film 22 is capable of converting the reproducing light 2 into heat more efficiently.

Material of the light-absorbing film 22 is not particularly limited. However, with the light-absorbing film made of material which efficiently increases the temperature of the reproducing film 21, it is possible to reduce the power of the reproducing light 2 to be used. This improves reproduction sensitivity of the reproducing device which emits the reproducing light 2 and thereby reads out information stored in the optical information recording medium 1.

For this reason, it is preferable that the light-absorbing film 22 is made of material such as: a semiconductor (e.g., such as a Si film and a Ge film); a semi-metal; a phase-change material; a magneto-optical recording material; and a coloring matter absorbing the reproducing light 2. Further, it is more preferable that the light-absorbing film 22 is made of the Si film and the Ge film because of the following reasons: (i) the Si film and the Ge film provide a best reproducing sensitivity; (ii) the Si film and the Ge film are relatively easy to be processed for manufacturing the light-absorbing film 22; (iii) the Si film and the Ge film are available at a relatively low price; and the like.

Further, the light-absorbing film 22 also serves as a reflecting film. The light-absorbing film 22, which serves as the reflecting film, is formed on a prepit 31 (described later). This allows the reproducing device, which emits the reproducing light 2, to recognize a protrusion/depression pattern made by the prepit 31 as information stored in the optical information recording medium 1.

The information recording layer 20 includes the reproducing film 21 and the light-absorbing film 22. However, the information recording layer 20 may be arranged so as to include the reproducing film 21 alone. However, it is preferable that the information recording layer 20 is arranged so as to include the light-absorbing film 22 between the reproducing film 21 and the substrate 30. The light-absorbing film 22 allows heat to be supplied mainly to the reproducing film 21. This leads to a better super-resolution characteristic.

Further, in the information recording layer 20, the reproducing film 21 and the light-absorbing film 22 are stacked separately. That is, (i) the reproducing film 21, which is a film for producing the super-resolution effect and whose complex refractive index at a light source wavelength $\lambda$ of reproducing light is changed by heat, and (ii) the light-absorbing film 22, which absorbs light, converts the light into heat, and supplies the heat to the reproducing film 21 are stacked such that the reproducing film 21 and the light-absorbing film 22 are separated from each other.

Therefore, the information recording layer 20 exhibits more excellent reproduction durability, compared with a film (super-resolution film) which directly absorbs light and heat, such as: the layer contributing to the super-resolution reproduction disclosed in Patent Document 1; the reproducing film disclosed in Patent Document 2; and the dye film and the phase-change film used in other super-resolution techniques.

Figure 2:
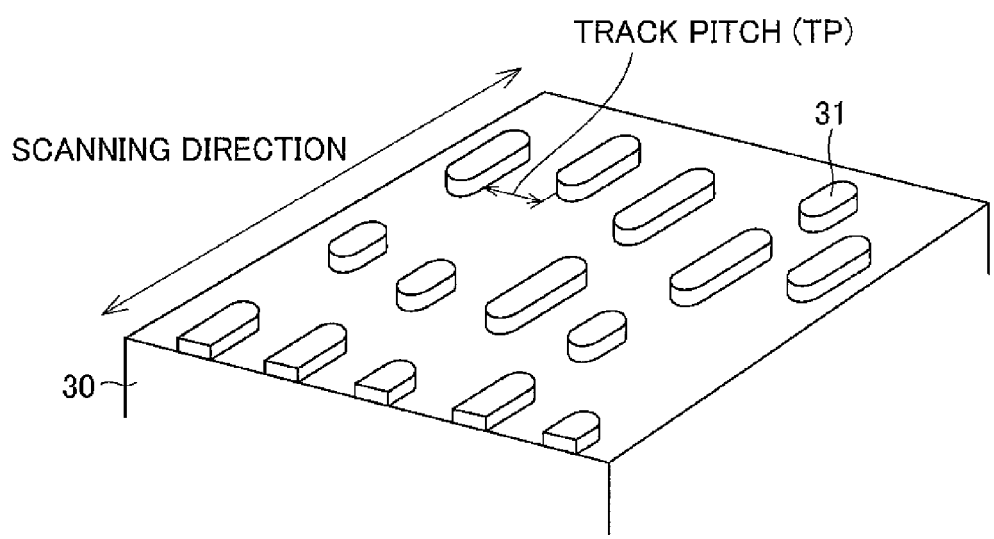
FIG. 2 is a perspective view illustrating a part of a substrate of the optical information recording medium according to one embodiment of the present invention, when viewed obliquely from above.

Next, the following describes, with reference to FIG. 2, (i) the substrate 30 and (ii) the prepit 31 formed on the substrate 30.

FIG. 2 is an enlarged perspective view of a part of the light incident surface of the substrate 30.

As shown in FIG. 2, the prepit 31, which makes the protrusion/depression pattern, is formed on the substrate 30.

Material of the substrate 30 is not particularly limited. Examples of the material of the substrate 30 may encompass: thermoplastic transparent resin (plastic) such as polyolefin plastic, polycarbonate, thermoplastic polyimide, PET (polyethylene terephthalate), PEN (polyether nitrile), and PES (polyether sulfone); thermoset transparent resin such as thermoset polyimide and ultraviolet-curing acrylic resin; glass; and a combination of selected ones of these.

The prepit 31 allows the optical information recording medium 1 to have a function as a so-called reproduction-dedicated optical information recording medium. The prepits 31 are provided (i) along a circle whose center coincides with a rotation axis (not illustrated) of the optical information recording medium 1 or (ii) spirally around the rotation axis of the optical information recording medium 1.

By irradiating the reproducing light 2 onto the prepit 31, it is possible to reproduce information stored in the optical information recording medium 1. A string of the prepits 31 is called "recording track". A gap between the recording tracks in a direction perpendicular to a scanning direction with respect to the recording track is called "track pitch (TP)".

The track pitch is given so as to satisfy the following relationship in terms of the light source wavelength $\lambda$ of the reproducing light 2 and a numerical aperture NA of an objective lens for forming a light spot:

$$0.67 \times (\lambda/NA) > TP > 0.04 \times (\lambda/NA)$$

Firstly, the following describes the reason why the track pitch is given so as to satisfy the relationship "$TP<0.67\times(\lambda/NA)$".

In a case where the relationship "$TP=0.67\times(\lambda/NA)$" is satisfied in a conventional optical information recording medium not including the reproducing film 21, a crosstalk amount reaches a limit of the crosstalk amount required by the reproducing device reaches its limit. (This will be described later.) Therefore, it is impossible to arrange the conventional optical information recording medium so as to satisfy the relationship "$TP<0.67\times(\lambda/NA)$".

The optical information recording medium 1 according to the present invention, which includes the reproducing film 21, improves crosstalk more than the conventional optical information recording medium does.

Therefore, even in a case where the relationship "$TP<0.67\times(\lambda/NA)$" is satisfied in the optical information recording medium 1, it is possible for the optical information recording medium 1 to satisfy the crosstalk amount required by the reproducing device. This allows the optical information recording medium 1 to increase a density of the recording track, thereby improving its recording capacity.

Next, the following describes the reason why the track pitch is given so as to satisfy the relationship "$TP>0.04\times(\lambda/NA)$".

By providing the reproducing film 21 to the optical information recording medium 1 according to the present invention, crosstalk is improved more than in the conventional optical information recording medium. (This will be described later.)

However, there is a case where (i) an improved amount of crosstalk occurring from a recording track inwardly adjacent to a target recording track is different from (ii) an improved amount of crosstalk occurring from a recording track outwardly adjacent to the target recording track.

In order to avoid this, the center of the reproducing light 2 is shifted from the center of the target recording track. This equalizes (i) the improved amount of the crosstalk occurring from the recording track inwardly adjacent to the target recording track with (ii) the improved amount of the crosstalk occurring from the recording track outwardly adjacent to the target recording track. This further improves crosstalk, thereby increasing track density.

In order to shift the center of the reproducing light 2 in such a direction that (i) the improved amount of the crosstalk occurring from the recording track inwardly adjacent to the target recording track and (ii) the improved amount of the crosstalk occurring from the recording track outwardly adjacent to the target recording track are equalized as described above, (a) a minimum value of the amount of the shifting should be $0.02\times(\lambda/NA)$ and (b) the relationship "$TP>0.04\times(\lambda/NA)$" should be satisfied. This is the reason why.

Next, the following describes one example of a method of manufacturing the optical information recording medium 1 according to the present embodiment.

The optical information recording medium 1 is made in the following manner. The substrate 30 is made, and then the light-absorbing film 22 is formed on the substrate 30. After that, the reproducing film 21 is formed on the light-absorbing film 22, and then the light-transmitting layer 10 is formed on the reproducing film 21.

In the present embodiment, the light-absorbing film 22 and the reproducing film 21 are formed by means of a sputtering method. However, a method of forming these films is not limited to the sputtering method, Instead of the sputtering method, for example, a vapor deposition method may also be used. The method of forming the films only needs to be capable of forming the light-absorbing film 22 and the reproducing film 21 on the substrate 30 in this order and in a flat shape.

Then, the light-transmitting layer 10 is formed, for example, as follows: A transparent adhesive resin layer and a polycarbonate film on the transparent adhesive resin layer are formed on the reproducing film 21 by means of the sputtering method, a spin-coating method, or the like.

In this manner, the optical information recording medium 1 is made.

The optical information recording medium 1 according to the present embodiment is not limited to the arrangement illustrated in FIG. 1. The optical information recording medium 1 may have various types of arrangements, as far as the optical information recording medium 1 includes the substrate 30 and the reproducing film 21 as essential components. For example, other films such as a protection film and a heat adjustment film may be added to the optical information recording medium 1.

In the description given so far, the optical information recording medium 1 according to the present embodiment is the reproduction-dedicated optical information recording medium. However, the present invention is not limited to this, but may also be applied to, for example, a write-once optical information recording medium and a rewritable optical information recording medium.

For example, in the case where the present invention is applied to the write-once optical information recording medium or the rewritable optical information recording medium, a groove and a land may be formed on the substrate 30 as a guide groove. In this case, the groove and the land serve as a recording track.

Further, the information recording layer 20 needs to include (i) the reproducing film 21 as an essential component and (ii) at least a recording layer such as a phase-change film and a magneto-optical film.

[Experiment 1]

With respect to an optical information recording medium 1 including a reproducing film 21, the following experiments were carried out: (i) an experiment for confirming an improvement in a linear recording density of the optical information recording medium 1; (ii) an experiment for confirming an improvement in a track density; and (iii) an experiment for confirming reproduction durability of the reproducing film 21.

[1-1. Experiment for Confirming Improvement in Linear Recording Density]

Firstly, in order to confirm that the linear recording density is improved in the optical information recording medium 1 due to the formation of the reproducing film 21 on the optical information recording medium 1, the following three types of optical information recording media were made, and evaluation thereof was carried out.

The three types of optical information recording media were: Example 1-1, which was a non-super-resolution medium according to the conventional technique; Example 1-2, which was a super-resolution medium disclosed in Patent Document 1; and Example 1-3, which was a super-resolution medium including a reproducing film 21 whose complex refractive index at a light source wavelength λ of reproducing light 2 was changed by heat.

The three types of optical information recording media of Examples 1-1, 1-2, and 1-3 had the following arrangements, respectively.

Example 1-1 included (i) a polycarbonate film (80 μm) and a transparent adhesive resin layer (20 μm) as the light-transmitting layer 10, (ii) Au (50 nm) as the reflecting film, and (iii) a polyolefin resin substrate as the substrate 30, which were formed in this order from its light incident surface.

Example 1-2 included (i) a polycarbonate film (80 μm) and a transparent adhesive resin layer (20 μm) as the light-transmitting layer 10, (ii) Ge (50 nm) as the layer contributing to the super-resolution reproduction, (iii) and a polyolefin resin substrate as the substrate 30, which were formed in this order from its light incident surface.

Example 1-3 included (i) a polycarbonate film (80 μm) and a transparent adhesive resin layer (20 μm) as the light-transmitting layer 10, (ii) a zinc oxide (144 nm) as the reproducing film 21 whose complex refractive index at the light source wavelength λ of the reproducing light 2 was changed by the heat, (iii) Ge (50 nm) as the light-absorbing film 22, and (iv) a polyolefin resin substrate as the substrate 30, which were formed in this order from its light incident surface.

The substrate 30 was provided with a monotone pit as the prepit 31 making the protrusion/depression pattern and contributing to information. The monotone pits were formed while maintaining a track pitch of 0.32 μm therebetween, and a mark length of each of the monotone pits was in a range from 80 nm to 140 nm.

Next, the following describes a comparison result between: a super-resolution characteristic of Example 1-1; a super-resolution characteristic of Example 1-2; and a super-resolution characteristic Example 1-3.

Figure 3:
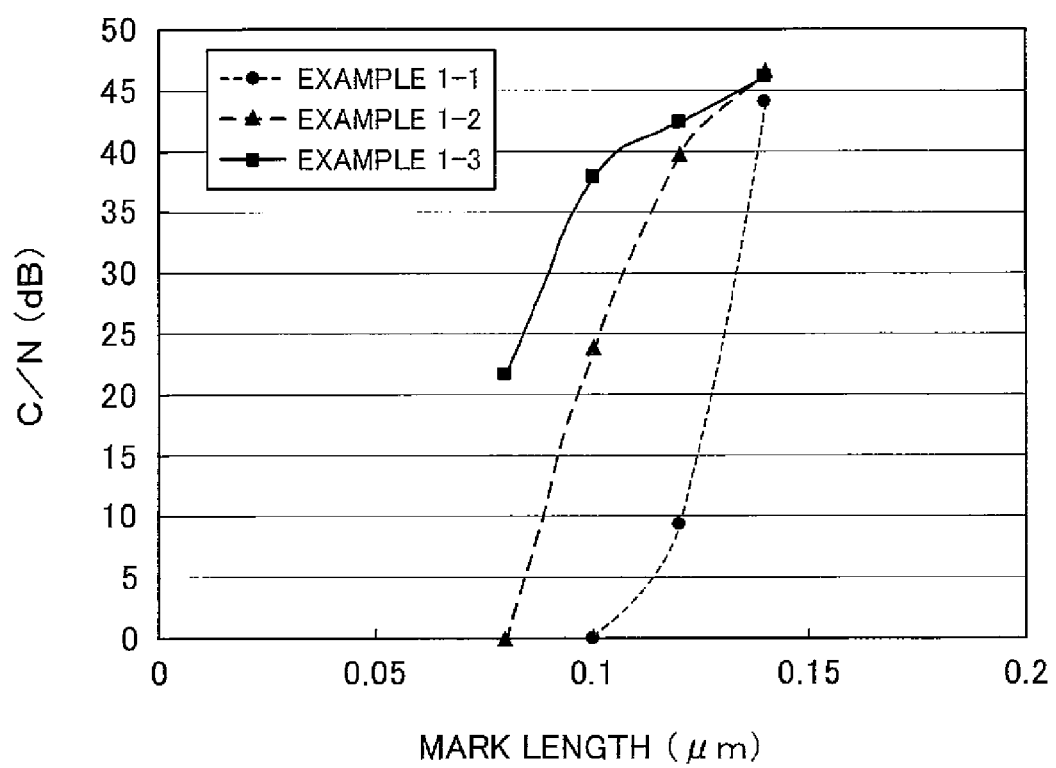
FIG. 3 is for explaining the optical information recording medium according to one embodiment of the present invention, and is a characteristic diagram illustrating a mark length dependency of a C/N (i.e., an OTF) in each of Example 1-1, Example 1-2, and Example 1-3.

FIG. 3 shows a result of a measurement in which an OTF was measured in Example 1-1, in Example 1-2, and in Example 1-3. The measurement was carried out with use of (i) a semiconductor laser for emitting light having a wavelength of 406 nm, which was a wavelength of blue laser light, and (ii) a disc measuring apparatus including an optical system having an NA (numerical aperture) of 0.85.

A theoretical optical resolution limit of the disc measuring apparatus used in the present embodiment was a mark length of approximately 0.12 μm.

The OTF is an index for expressing super-resolution performance, and indicates a mark length dependency of a C/N. The C/N is an evaluation standard for indicating a signal quality.

In the disc measuring apparatus used for the measurement in the present experiment, reproducing light 2 was available with irradiation power in a range from 0 mW to 2.0 mW.

In the measurement of Example 1-1, Example 1-2, and Example 1-3, the irradiation power of the reproducing light 2, by which the data shown in FIG. 3 was obtained, was set at such a value that a best C/N was obtained at mark lengths of 0.12 μm and 0.10 μm. Note that (i) the mark length of 0.12 μm was equal to the optical resolution limit and (ii) the mark length of 0.10 μm was shorter than the optical resolution limit.

Specifically, the irradiation power of the reproducing light 2 was set at 2.0 mW in Example 1-1, at 0.75 mW in Example 1-2, and at 2.0 mW in Example 1-3. Further, the measurement was carried out with a linear velocity of 3.0 m/s.

As shown in FIG. 3, in Example 1-1, the C/N is 10 dB or less at the mark length of 0.12 μm, which is the theoretical optical resolution limit of the disc measuring apparatus. Thus, the C/N is rarely confirmed in Example 1-1. This result shows that Example 1-1 does not have the super-resolution effect.

On the other hand, in Example 1-2, the C/N is 40 dB at the mark length of 0.12 μm, which is the theoretical optical resolution limit; and the C/N is 24 dB at the mark length of 0.10 μm, which is shorter than the theoretical optical resolution limit.

In Example 1-3, the C/N is 42 dB at the mark length of 0.12 μm, which is the theoretical optical resolution limit; the C/N is 38 dB at the mark length of 0.10 μm, which is shorter than the theoretical optical resolution limit; and the C/N is 22 dB at the mark length of 0.08 μm, which is shorter than the theoretical optical resolution limit.

These results show that Example 1-2 and Example 1-3 have the super-resolution effect.

Assuming that a C/N required to reproduce a signal is 35 dB, it is possible to carry out a reproduction: at a mark length of 0.14 μm or longer in Example 1-1; at a mark length of 0.12 μm or longer in Example 1-2; and at a mark length of 0.10 μm or longer in Example 1-3.

Further, assuming that the C/N required to reproduce the signal is 20 dB, it is possible to carry out a reproduction: at a mark length of 0.10 pm or longer in Example 1-2; and at a mark length of 0.08 μm or longer in Example 1-3.

This result shows that the super-resolution medium disclosed in Patent Document 1 and the super-resolution medium including the reproducing film 21 according to the present embodiment improve the linear recording density more than the conventional non-super-resolution medium does. Further, this result also shows that the super-resolution medium including the reproducing film 21 according to the present embodiment improves the linear recording density more than the super-resolution medium disclosed in Patent Document 1 does.

[1-2. Experiment for Confirming Improvement in Track Density]

Next, in order to confirm that the track density is improved in the optical information recording medium 1 according to the present embodiment due to the reproducing film 21, the following three types of optical information recording media were made, and evaluation thereof was carried out.

The three types of optical information recording media were: Example 2-1, which was a non-super-resolution medium according to the conventional technique; Example 2-2, which was a super-resolution medium disclosed in Patent Document 1 (a conventional technique); and Example 2-3, which was a super-resolution medium including a reproducing film 21.

The three types of optical information recording media of Examples 2-1, 2-2, and 2-3 had the following arrangements, respectively.

Example 2-1 included (i) a polycarbonate film (80 μm) and a transparent adhesive resin layer (20 μm) as the light-transmitting layer 10, (ii) Au (50 nm) as the reflecting film, and (iii) a polyolefin resin substrate as the substrate 30, which were formed in this order from its light incident surface.

Example 2-2 included (i) a polycarbonate film (80 μm) and a transparent adhesive resin layer (20 μm) as the light-transmitting layer 10, (ii) Ge (50 nm) as the layer contributing to the super-resolution reproduction, (iii) and a polyolefin resin substrate as the substrate 30, which were formed in this order from its light incident surface.

Example 2-3 included (i) a polycarbonate film (80 μm) and a transparent adhesive resin layer (20 μm) as the light-transmitting layer 10, (ii) a zinc oxide (144 nm) as the reproducing film 21 whose complex refractive index at the light source wavelength λ of the reproducing light was changed by the heat, (iii) Ge (50 nm) as the light-absorbing film 22, and (iv) a polyolefin resin substrate as the substrate 30, which were formed in this order from its light incident surface.

The substrate 30 was provided with a monotone pit as the prepit making the protrusion/depression pattern and contributing to information. The monotone pits were formed while maintaining a track pitch of 0.32 μm therebetween. Further, (i) a recording track including monotone pits having a mark length of 175 nm, (ii) a recording track including monotone pits having a mark length of 160 nm, and (iii) a recording track including monotone pits having a mark length of 147 nm were formed in this order repeatedly from an innermost recording track.

Next, the following describes a comparison result between: a crosstalk amount of Example 2-1; a crosstalk amount of Example 2-2, and a crosstalk amount of Example 2-3.

Each of (a) and (b) of FIG. 4 shows a result obtained by a measurement of how much a crosstalk amount depends on irradiation power of reproducing light 2, the measurement having been carried out with respect to Example 2-1, Example 2-2, and Example 2-3. The measurement was carried out with use of (i) a semiconductor laser for emitting light having a wavelength of 406 nm, which was a wavelength of blue laser light, and (ii) a generally-used disc measuring apparatus including an optical system having an NA (numerical aperture) of 0.85.

(a) of FIG. 4 shows a result obtained by a measurement of how much a crosstalk amount with respect to a recording track inwardly adjacent to a target recording track depends on the power of the reproducing light 2; and (b) of FIG. 4. shows a result obtained by a measurement of how much a crosstalk amount with respect to a recording track outwardly adjacent to the target recording track depends on the power of the reproducing light 2.

In the present embodiment, the "crosstalk amount" refers to a difference in a carrier level between (i) a target recording track under scanning by the reproducing light 2 and (ii) a recording track adjacent to the target recording track. The higher a value of the crosstalk amount is, the less is signal leakage from the recording track adjacent to the target recording track.

In the present embodiment, a mark length of the monotone pit included in the target recording track under scanning by the reproducing light 2 is 160 nm; a mark length of the monotone pit included in the recording track inwardly adjacent to the target recording track is 175 nm; and a mark length of the monotone pit included in the recording track outwardly adjacent to the target recording track is 147 nm. The difference in the carrier level is expressed by a unit "dB".

However, it is impossible to properly evaluate, with this definition of the crosstalk amount, the signal leakage from the recording track adjacent to the target recording track under the scanning by the reproducing light 2, in the following case: When the irradiation power of the reproducing light 2 is increased at the target recording track, the super-resolution effect is produced by the reproducing film 21 and thereby the C/N is improved, so that the value of the crosstalk amount is increased therein.

However, with regard to this point, it was confirmed in Example 2-1, Example 2-2, and Example 2-3 that the C/N at each of the mark lengths of 175 nm, 160 nm, and 147 nm was not changed depending on the irradiation power of the reproducing light 2. Therefore, there is no problem with this point. The linear velocity during this measurement was 3.0 m/s.

That is, the track density depends mainly on the crosstalk amount defined as described above. As the value of the crosstalk amount is increased, the signal leakage from the recording track adjacent to the target recording track is reduced, so that the track density is further increased.

As shown in (a) of FIG. 4, in Example 2-2 (i.e., the super-resolution medium disclosed in Patent Document 1) as well as in Example 2-1 (i.e., the non-super-resolution medium), the crosstalk amount with respect to the recording track inwardly adjacent to the target recording track does not depend on the irradiation power of the reproducing light 2, and stays at approximately at 20 dB.

Further, as shown in (b) of FIG. 4, in Example 2-1 and Example 2-2, the crosstalk amount with respect to the recording track outwardly adjacent to the target recording track does not depend on the irradiation power of the reproducing light 2, and stays at approximately at 23 dB.

Here, the reproducing device for emitting the reproducing light 2 requires almost the same value of the crosstalk amount as the value obtained in Example 2-1 (i.e., the non-super-resolution medium) so as to carry out a reproduction stably. That is, the following crosstalk amounts are required: (i) approximately 20 dB as the crosstalk amount with respect to the recording track inwardly adjacent to the target recording track; and (ii) approximately 23 dB as the crosstalk amount with respect to the recording track outwardly adjacent to the target recording track.

Generally, increasing the track density is reducing the track pitch. Reducing the track pitch increases the signal leakage from the recording track adjacent to the target recording track, thereby reducing the crosstalk amount. That is, in Example 2-1 and Example 2-2, it is impossible to reduce the track pitch to less than 0.32 μm in a case where the disc measuring apparatus used in this measurement is used.

If the diameter of the spot of the reproducing light 2 is changed, the track pitch satisfying the above-mentioned crosstalk amount is also changed. Therefore, in Example 2-1 and Example 2-2, it is impossible to reduce the track pitch to less than $0.67 \times (\lambda/NA)$, where λ is the light source wavelength of the reproducing light 2 (i.e., the diameter of the spot of the reproducing light 2) and NA is the numerical aperture of the objective lens.

On the other hand, (a) and (b) of FIG. 4 show the following result regarding Example 2-3 (i.e., the super-resolution medium using the reproducing film 21): When the irradiation power of the reproducing light 2 is increased, the crosstalk amount is increased. Further, according to (a) and (b) of FIG. 4, (i) the crosstalk amount with respect to the recording track inwardly adjacent to the target recording track and (ii) the crosstalk amount with respect to the recording track outwardly adjacent to the target recording track in Example 2-3 are larger, compared with those in Example 2-1 and Example 2-2. That is, the crosstalk amount is improved in Example 2-3 more than in Example 2-1 and Example 2-2.

For example, in a case where the irradiation power of the reproducing light 2 is 1.25 mW, (i) the crosstalk amount with respect to the recording track inwardly adjacent to the target recording track is 25 dB, and (ii) the crosstalk amount with respect to the recording track outwardly adjacent to the target recording track is approximately 38 dB.

As described above, in general, reducing the track pitch also reduces the crosstalk amount. The track pitch is allowed to be reduced until (i) the crosstalk amount with respect to the recording track inwardly adjacent to the target recording track becomes approximately 20 dB and (ii) the crosstalk amount with respect to the recording track outwardly adjacent to the target recording track becomes approximately 23 dB. The values of approximately 20 dB and approximately 23 dB are the crosstalk amounts required to allow the reproducing device to carry out a reproduction stably.

Therefore, in Example 2-3 (i.e., the super-resolution medium using the reproducing film 21), it is possible to reduce the track pitch to less than $0.67 \times (\lambda/NA)$ and thereby to increase the track density.

Further, as shown in (a) and (b) of FIG. 4, Example 2-3 may have (i) the crosstalk amount with respect to the recording track inwardly adjacent to the target recording track which is greatly different from (ii) the crosstalk amount with respect to the recording track outwardly adjacent to the target recording track. (This will be described in detail later in Second Embodiment.)

In order to deal with this, the reproducing device for emitting the reproducing light 2 outwardly shifts the center of the reproducing light 2 from the center of the recording track. This equalizes (i) the crosstalk amount with respect to the recording track inwardly adjacent to the target recording track with (ii) the crosstalk amount with respect to the recording track outwardly adjacent to the target recording track. Thereby, the crosstalk amount is further improved. This further increases the track density.

However, a minimum value of the amount of the outward shifting for improving the crosstalk amount is $0.02 \times (\lambda/NA)$. Therefore, unless the center of the reproducing light 2 is outwardly shifted by TP ($>0.04 \times (\lambda/NA)$), it does not substantially mean that the center of the reproducing light 2 is outwardly shifted, that is, it is impossible to expect the effect to be obtained by the outward shifting of the center of the reproducing light 2 from the center of the recording track. For this reason, it is impossible to reduce the track pitch to less than $0.04 \times (\lambda/NA)$.

Thus, in Example 2-1 (i.e., the non-super-resolution medium) and Example 2-2 (i.e., the super-resolution medium disclosed in Patent Document 1 capable of improving the linear recording density as illustrated in FIG. 3), it is impossible to reduce the track pitch to less than $0.67 \times (\lambda/NA)$, and therefore it is impossible for them to increase the track density.

On the other hand, in Example 2-3 (i.e., the super-resolution medium including the reproducing film 21), it is possible to reduce the track pitch to a value within a range of less than $0.67 \times (\lambda/NA)$ to more than $0.04 \times (\lambda/NA)$ and thereby to increase the track density.

[1-3. Experiment for Confirming Reproduction Durability of Reproducing Film 21]

Next, the following describes the reproduction durability of the optical information recording medium 1 obtained due to the reproducing film 21.

The reproduction durability was compared between (i) Example 1-2 (i.e., the optical information recording medium) and (ii) Example 1-3 (i.e., the optical information recording medium), with respect to a reproduced signal having a mark length of 0.10 μm. As a result, it was confirmed that Example 1-3 was more excellent in the reproduction durability than Example 1-2, i.e., the reproducing film 21 was excellent in the reproduction durability. The following describes this point in detail.

An optical information recording medium 1 illustrated in FIG. 1 was made. Hereinafter, the optical information recording medium 1 thus made is called "first experiment medium". The following describes making of the first experiment medium and an evaluation result of the first experiment medium.

The first experiment medium, which was the optical information recording medium 1 illustrated in FIG. 1, included (i) a polycarbonate film (80 μm) and a transparent adhesive resin layer (20 μm) as the light-transmitting layer 10, (ii) a zinc oxide (144 nm) as the reproducing film 21 whose complex refractive index at the light source wavelength λ of the reproducing light 2 was changed by the heat, (iii) Ge (50 nm) as the light-absorbing film 22, and (iv) a polyolefin resin substrate as the substrate 30, which were formed in this order from its light incident surface.

The substrate 30 was provided with a monotone pit as the prepit making the protrusion/depression pattern and contributing to information. The monotone pits were formed while maintaining a track pitch of 0.30 μm (which is less than $0.67 \times (\lambda/NA)$=approximately 0.32 μm, but more than $0.04 \times (\lambda/NA)$=approximately 0.02 μm) therebetween. Further, a mark length of the monotone pit was 94 nm.

The measurement with respect to the first experiment medium was carried out with use of (i) a semiconductor laser for emitting light having a wavelength of 406 nm, which was a wavelength of blue laser light, and (ii) a disc measuring apparatus including an optical system having an NA (numerical aperture) of 0.85. As a result, under the condition where the linear velocity was 3.0 m/s and the power of the reproducing light was 1.5 mW, the C/N at the mark length of 94 nm was 27 dB. This shows that the first experiment medium is excellent in reproduction durability.

Thus, the following facts regarding the first experiment medium, which is also available as a reproduction-dedicated optical information recording medium, are confirmed: (i) The linear recording density and the track density are improved in the first experiment medium, thereby allowing the first experiment medium to reproduce higher-density recording information. (ii) The first experiment medium is an optical information recording medium excellent in the reproduction durability.

[Second Embodiment]

Next, as Second Embodiment, the following describes a method of increasing a track density by outwardly shifting the center of reproducing light 2 from the center of a target recording track and thereby equalizing (i) a crosstalk amount with respect to a recording track inwardly adjacent to the target recording track with (ii) a crosstalk amount with respect to a recording track outwardly adjacent to the target recording track.

FIG. 5 shows a reproducing device 50 for irradiating the reproducing light 2 onto an optical information recording medium 60. The optical information recording medium 60 is not limited to an optical information recording medium 1 according to the present embodiment, but may be a generally-used optical information recording medium.

The reproducing device 50 includes (i) an optical head 58 containing a semiconductor laser 51 (laser light emitting means), a collimating lens 52 (light-converging optical means), a beam shaping prism 53 (light-converging optical means), a beam splitter 54 (light-converging optical means), an objective lens 55 (light-converging optical means), and a detection optical system 56 (photoelectric conversion means) and (ii) a spindle motor 57.

Further, the reproducing device 50 includes relative movement means, servo means, address information detecting means, reproduction signal demodulating means, and the like (each of which is not illustrated in the figure).

The semiconductor laser 51 used in the present embodiment emits light having a wavelength of 406 nm.

The reproducing light 2 is a laser beam emitted from the semiconductor laser 51. The reproducing light 2 is shaped into a beam by means of optical components such as focusing lenses (e.g., the collimating lens 52 and the objective lens 55), the beam shaping prism 53, and the beam splitter 54. Then, the reproducing light 2 is converged onto the optical information recording medium 1.

The relative movement means (not illustrated) is for making a relative movement between the light-converging optical means and the optical information recording medium 60. The relative movement means includes a linear actuator (not illustrated), a swing arm (not illustrated), and the like. The relative movement includes either one of (i) rotation or parallel movement of the optical information recording medium 1 or (ii) movement of the focusing lenses included in the light-converging optical means in a direction perpendicular to an optical axis.

The detection optical system 56 is for converting, into an electric signal, a rise and a fall of a level of reflected light from the optical information recording medium 60. The servo means (not illustrated) is for carrying out automatic focusing with respect to the reproducing light 2 and tracking with respect to the reproducing light 2.

The address information detecting means (not illustrated) is for detecting address information in accordance with an electric signal obtained by a reproduction of an address information mark provided on the optical information recording medium 60. The reproduction signal demodulating means (not illustrated) is for reproducing recording information stored in the optical information recording medium 60 in accordance with the reflected light from the optical information recording medium 60.

In the present embodiment, the optical head 58 includes the laser light emitting means, the light-converging optical means, the photoelectric conversion means, and the serve means. Further, the optical head 58 and the optical information recording medium 60 are caused to make the relative movement by means of the relative movement means. However, instead of this arrangement, the laser light emitting means, the photoelectric conversion means, and the light-converging optical means may be stored in another case which is not the optical head 58.

Further, it is preferable that the reproducing device includes angle adjustment means for adjusting an angle made by the reproducing light 2 and the optical information recording medium 60. This prevents a light spot from being deteriorated due to an aberration of the reproducing light 2 occurred on the optical information recording medium 60.

The reproducing device 50 of Second Embodiment is capable of reproducing the optical information recording medium 1 of First Embodiment.

In the reproducing device 50, laser light is emitted from the semiconductor laser 51, which is a light source, and the laser light is converted into substantially collimated light by means of the collimating lens 52. Then, the collimated light is shaped by means of the beam shaping prism 53 so as to have light intensity distribution in a substantially circular shape.

The collimated light having the substantially circular light intensity distribution is transmitted through the beam splitter 54, and then is converged onto the optical information recording medium 60 as the reproducing light 2 by means of the objective lens 55. Then, the reflected light from the optical information recording medium 60 is split by the beam splitter 54, and then is directed to the detection optical system 56.

The spindle motor 57 rotates the optical information recording medium 60 so that the optical information recording medium 60 is scanned by the reproducing light 2.

Further, the detection optical system 56 identifies a signal obtained from the optical information recording medium 60 in accordance with (i) a change in a polarizing direction of the reflected light from the optical information recording medium 60 and (ii) a change in intensity of the reflected light. Thereby, the detection optical system 56 reads out a recording mark recorded on the optical information recording medium 60.

Furthermore, at the same time, the detection optical system 56 detects (i) a focusing error signal indicating a focusing error of the reproducing light 2 with respect to the optical information recording medium 60 and (ii) a track position error signal of the optical information recording medium 60. The focusing error signal and the track position error signal are fed back for the position of the objective lens 55. Thereby, the optical head 58 is caused to operate so as to correct a position error occurred between the reproducing light 2 and the optical information recording medium 60. In Second Embodiment, the numerical aperture (NA) of the objective lens 55 is set at, for example, 0.85.

Then, in a case where the reproducing device 50 identifies the optical information recording medium 60 as the optical information recording medium 1 of First Embodiment, the optical head 58 is caused to operate so that a reproduction is carried out such that the center of the reproducing light 2 is shifted from the center of the recording track by an amount which is more than $0.02 \times (\lambda/NA)$ but less than TP/4.

The identification of whether or not the optical information recording medium 60 is the optical information recording medium 1 of First Embodiment may be carried out, in such a manner that (i) information indicating that the optical information recording medium is the optical information recording medium 1 is embedded in, for example, a lead-in area of the optical information recording medium 60 in advance and (ii) the reproducing device 50 causes the detection optical system to detect the information in accordance with reflected light from the lead-in area of the optical information recording medium 60.

Examples of the method of operating the optical head 58 so that the reproduction is carried out such that the center of the reproducing light 2 is shifted from the center of the recording track by the amount which is more than $0.02 \times (\lambda/NA)$ but less than TP/4 may encompass a method of electrically offsetting the track position error signal. By the electrical offsetting, it is possible to control the amount of the shifting of the center of the reproducing light 2 from the center of the recording track.

As shown in (a) and (b) of FIG. 4, in the optical information recording medium 60, the crosstalk amount with respect to the recording track inwardly adjacent to the target recording track is smaller than the crosstalk amount with respect to the recording track outwardly adjacent to the target recording track. Therefore, to what extent the track pitch of the optical information recording medium 60 is reduced is dominantly determined by the crosstalk mount with respect to the recording track inwardly adjacent to the target recording track.

In view of this, by carrying out the reproduction such that the center of the reproducing light 2 is outwardly shifted from the center of the recording track, it is possible to equalize (i) the crosstalk amount with respect to the recording track inwardly adjacent to the target recording track with (ii) the crosstalk amount with respect to the recording track outwardly adjacent to the target recording track.

This allows the optical information recording medium 60 to have an even narrower track pitch, compared with a case where the reproduction is carried out such that the center of the reproducing light 2 is not shifted from the center of the recording track. That is, this allows the optical information recording medium 60 to increase its track density. The following describes how the amount of the outward shifting of the center of the reproducing light 2 from the center of the recording track is determined.

In general, a tracking servo is required to reduce a fluctuation in movement to a value of 0.02×(λ/NA) or less for the purpose of reproducing a signal stably.

That is, even in a case where the reproduction is carried out such that the center of the reproducing light 2 is coincident with the center of the recording track, there is a possibility that the center of the reproducing light 2 is actually shifted from the center of the reproducing track by 0.02×(λ/NA) at maximum.

Therefore, by shifting the center of the reproducing light 2 from the center of the recording track by an amount more than 0.02×(λ/NA), it is possible to effectively improve the track density of the optical information recording medium 60.

As a tracking servo, a push-pull tracking servo, which is generally used as the tracking servo, may be used. In this case, by electrically offsetting a position error signal indicative of a position error between the center of the reproducing light 2 and the center of the recording track, the center of the reproducing light 2 may be shifted from the center of the recording track by an amount of ±(TP/4) at maximum, where TP is the track pitch.

That is, (TP/4) is a maximum amount of the shifting of the center of the reproducing light 2 from the center of the recording track, for the purpose of effectively increasing the track density of the optical information recording medium 60.

Thus, the reproducing device 50 reproduces the optical information recording medium 60 such that the center of the reproducing light 2 is shifted from the center of the recording track by the amount which is more than 0.02×(λ/NA) but less than TP/4.

This allows the optical information recording medium 60 to have an even narrower track pitch, compared with a case where the reproduction is carried out such that the center of the reproducing light 2 is not shifted from the center of the recording track. That is, this allows the optical information recording medium 60 to increase its track density.

Note that the optical information recording medium 60 which is reproduced by the reproducing device 50 such that the center of the reproducing light 2 is shifted from the center of the recording track by the amount which is more than 0.02×(λ/NA) but less than TP/4 is not limited to the optical information recording medium 1 of First Embodiment, but may be any optical information recording medium as far as it includes a reproducing film 21.

In this case, although it is impossible to expect the optical information recording medium to increase its track density, the crosstalk amount is improved due to the reproducing film 21 whose complex refractive index at the light source wavelength λ of the reproducing light is changed by the heat improves the crosstalk amount, as shown in FIG. 4.

However, (i) the crosstalk amount with respect to the recording track inwardly adjacent to the target recording track greatly differs from (ii) the crosstalk amount with respect to the recording track outwardly adjacent to the target recording track.

In order to deal with this, the reproduction is carried out such that the center of the reproducing light 2 is shifted from the center of the recording track by the amount which is more than 0.02×(λ/NA) but less than TP/4. This equalizes (i) the crosstalk amount with respect to the recording track inwardly adjacent to the target recording track with (ii) the crosstalk amount with respect to the recording track outwardly adjacent to the target recording track.

Thus, the crosstalk amount with respect to the recording track inwardly adjacent to the target recording track is increased. With this, the value of the crosstalk amount which is required by the reproducing device 50 for the purpose of carrying out the reproduction stably obtains an allowance, which is not obtained in the case where the reproduction is carried out such that the center of the reproducing light 2 is not shifted from the center of the recording track. Thereby, it is possible to reduce a cost of the reproducing device 50.

Further, the arrangement of the reproducing device 50 is not limited to the arrangement described so far. For example, the reproducing device 50 only needs to be capable of reproducing an optical information recording medium (e.g., the optical information recording medium 1) including a reproducing film 21 such that the center of the reproducing light 2 is shifted from the center of the recording track by the amount which is more than 0.02×(λ/NA) but less than TP/4.

Further, the reproducing device 50 may be (i) a device dedicated to a reproduction or a recording or (ii) a device capable of carrying out a reproduction and a recording. Furthermore, the reproducing device 50 may be an installed type or a portable type.

Moreover, a reproducing method according to First Embodiment of the optical information recording medium is a reproducing method in which the optical information recording medium 1 or an optical information recording medium including the reproducing film 21 is reproduced such that the center of the reproducing light 2 is shifted from the center of the recording track by the amount which is more than 0.02×(λ/NA) but less than TP/4.

[Experiment 2]

An optical information recording medium 1 was made, and the optical information recording medium 1 was reproduced by a reproducing device 50 such that the center of reproducing light 2 was shifted from the center of a recording track by an amount which is more than 0.02×(λ/NA) but less than TP/4. Then, an experiment for confirming reproduction durability of the optical information recording medium 1 was carried out.

The optical information recording medium 1 used in the present experiment was as illustrated in FIG. 1. The optical information recording medium 1 included (i) a polycarbonate film (80 µm) and a transparent adhesive resin layer (20 µm) as the light-transmitting layer 10, (ii) a zinc oxide (144 nm) as the reproducing film 21 whose complex refractive index at the light source wavelength λ of the reproducing light 2 was changed by the heat, (iii) Ge (50 nm) as the light-absorbing film 22, and (iv) a polyolefin resin substrate as the substrate 30, which were formed in this order from a side from which reproducing light 2 enters. Hereinafter, the optical information recording medium used in the present experiment is referred to as "second experiment medium".

The substrate 30 was provided with a monotone pit as the prepit 31 making the protrusion/depression pattern and contributing to information. The monotone pits were formed while maintaining a track pitch of 0.28 µm (which is less than 0.67×(λ/NA)=approximately 0.32 µm, but more than 0.04×(λ/NA)=approximately 0.02 µm) therebetween. Further, a mark length of the monotone pit was 94 nm.

A measurement with respect to the second experiment medium was carried out with use of (i) a semiconductor laser for emitting light having a wavelength of 406 nm, which was a wavelength of blue laser light, and (ii) the reproducing device 50 including an optical system having an NA (numerical aperture) of 0.85. Under the condition where linear velocity was 3.0 m/s and irradiation power of the reproducing light 2 was 1.5 mW, the reproduction was carried out such that the center of the reproducing light 2 was outwardly shifted from the center of the recording track by 20 nm (which was the amount within a range more than 0.02×(λ/NA)=approximately 10 nm but less than TP/4=70 nm). As a result, it was confirmed that a C/N at a mark length of 94 nm was 25 dB. This shows that the second experiment medium is excellent in reproduction durability.

Thus, it is confirmed that the reproducing device 50 of the present embodiment further improves the track density and is excellent in the reproduction durability.

The present invention is not limited to the description of the embodiments above, but may be altered by a skilled person within the scope of the claims. An embodiment based on a proper combination of technical means disclosed in different embodiments is encompassed in the technical scope of the present invention.

As described above, an optical information recording medium according to the present invention is arranged so as to be an optical information recording medium in which information has been recorded and from which the information is reproduced in response to reproducing light irradiated onto the optical information recording medium, the optical information recording medium, including: a light-transmitting layer or a transparent substrate; an information recording layer; and a substrate, the light-transmitting layer or the transparent substrate, the information recording layer, and the substrate being stacked in this order from a side from which the reproducing light enters, the information recording layer including at least a reproducing film whose complex refractive index at a light source wavelength λ of the reproducing light is changed by heat, and the following relationship being satisfied:

$$0.67\times(\lambda/NA) > TP > 0.04\times(\lambda/NA),$$

where TP is a track pitch of a recording track formed on the substrate and NA is a numerical aperture of an objective lens for converging the reproducing light onto the optical information recording medium.

With this, when the reproducing light enters the reproducing film whose complex refractive index at the light source wavelength λ of the reproducing light is changed by the heat, the reproducing film itself or a layer (e.g., a light-absorbing film) which is adjacent to the reproducing film absorbs a part of the reproducing light and converts the part of the reproducing light into heat.

The reproducing film is heated by the heat thus converted, so that temperature distribution is provided to the inside of a light spot on the reproducing film. It is considered that a recording mark having a mark length equal to or shorter than an optical resolution limit is reproduced as follows: (i) In accordance with the temperature distribution, optical constants n and k of the reproducing film are changed. (ii) This increases or decreases a reflection rate inside the high-temperature area. (iii) Thereby, the spot of the reproducing light is reduced in a pseudo manner.

Thus, with the information recording layer including the reproducing film whose complex refractive index at the light source wavelength λ of the reproducing light is changed by the heat, it is possible to increase a linear recording density. Further, it is also possible to improve crosstalk in a direction perpendicular to a scanning direction, because the spot of the reproducing light is reduced in the pseudo manner as described above.

Furthermore, according to an experiment, it has been confirmed that reproduction durability is improved in the optical information recording medium including the reproducing film whose complex refractive index at the light source wavelength λ of the reproducing light is changed by the heat. That is, with the reproducing film whose complex refractive index at the light source wavelength λ of the reproducing light is changed by the heat, it is possible to provide an optical information recording medium which is excellent in reproduction durability.

Moreover, with the information recording layer including the reproducing film, it is possible to improve the crosstalk. This allows a track pitch to be reduced.

Specifically, the present invention allows the track pitch to be reduced to less than 0.67×(λ/NA), which is a limit of a track pitch of a conventional technique, thereby allowing a gap between tracks to become narrower than that of the conventional technique. Therefore, the present invention attains an increased track density, which is not achieved by the super-resolution media according to Patent Document 1 and the like. Thus, the present invention provides an optical information recording medium having a higher density.

That is, the present invention increases the track density, as well as the linear recording density. This makes it possible for the present invention to attain a high-density recording capacity, which is not achieved by an optical information recording medium using the conventional super-resolution technique.

There is a case where (i) an improved amount of crosstalk occurring from a recording track inwardly adjacent to a target recording track on the optical information recording medium differs from (ii) an improved amount of crosstalk occurring from a recording track outwardly adjacent to the target recording track on the optical information recording medium. This difference is caused by, for example, the following reason. Because the optical information recording medium is rotating during a reproduction, the center of the spot of the reproducing light which spot is reduced in the pseudo manner is shifted from the center of the reproducing light. In order to deal with this, by setting the track pitch so that the relationship "TP>0.04×(λ/NA)" is satisfied as described above, it is possible to equalize (i) the improved amount of the crosstalk occurring from the recording track inwardly adjacent to the target recording track with (ii) the improved amount of the crosstalk occurring from the recording track outwardly adjacent to the target recording track. This further improves the crosstalk and increases the track density.

Further, an optical information recording medium according to the present invention is arranged so as to be an optical information recording medium in which information has been recorded and from which the information is reproduced in response to reproducing light irradiated onto the optical information recording medium, the optical information recording medium, including: a light-transmitting layer or a transparent substrate; an information recording layer; and a substrate, the light-transmitting layer or the transparent substrate, the information recording layer, and the substrate being stacked in this order from a side from which the reproducing light enters, and the information recording layer including at least a reproducing film mainly made of a metal oxide, and the following relationship being satisfied:

$$0.67\times(\lambda/NA) > TP > 0.04\times(\lambda/NA),$$

where TP is a track pitch of a recording track formed on the substrate and NA is a numerical aperture of an objective lens for converging the reproducing light on the optical information recording medium.

With the information recording layer including at least the reproducing film mainly made of the metal oxide, it is possible to improve (i) the linear recording density and (ii) the crosstalk in the direction perpendicular to the scanning direction. This allows the gap between the tracks to be reduced. This makes it possible for the present invention to attain an increased track density, which is not achieved by the super-resolution media according to Patent Document 1 and the like. Thereby, the present invention provides an optical information recording medium having a higher density.

That is, it is possible for the present invention to increase the track density, as well as the linear recording density. This makes it possible for the present invention to attain a higher-density recording capacity, which is not achieved by the optical information recording medium using the conventional super-resolution technique.

Further, the optical information recording medium using the reproducing film mainly made of the metal oxide exhibits good reproduction durability. This is because that the metal oxide is chemically stable, and therefore is not easily damaged by the incidence of the reproducing light. This makes it possible for the present invention to provide an optical information recording medium whose reproduction durability is improved compared with the optical information recording media disclosed in Patent Document 1 and Patent Document 2.

Furthermore, it is possible to form the reproducing film mainly made of the metal oxide by means of a vapor deposition method or a sputtering method. That is, it is relatively easy to form the reproducing film mainly made of the metal oxide.

Moreover, it is possible to collect the metal oxide as metal by deoxidizing the metal oxide. This improves recyclability of an optical information recording medium.

Further, in the optical information recording medium according to the present invention, it is preferable that the reproducing film is made of (i) a zinc oxide or (ii) a compound including, as a main component, a zinc oxide.

The zinc oxide, which is the metal oxide, is a chemically stable substance, that is, has good durability. Therefore, the zinc oxide is not molten and is not easily damaged by the irradiation of the reproducing light. This makes it possible to provide an optical information recording medium having a higher reproduction durability.

Further, the zinc oxide is available at a low price and has a less adverse effect on the environment. This reduces a cost of manufacturing, and provides an optical information recording medium which is environmentally friendly. Furthermore, this makes it possible to easily obtain an optical information recording medium according to the present invention.

Moreover, the zinc oxide is cheaper than a dye film. This makes it possible to reduce a cost, compared with a super-resolution technique using the dye film.

Furthermore, the zinc oxide has a high environmental stability and therefore requires a low control cost, whereas a phase-change material is difficult to be controlled and therefore requires a high control cost. This makes it possible reduce a cost, compared with a super-resolution technique using the phase-change film.

In a reproducing device for the optical information recording medium according to the present invention, a reproduction is carried out such that a center of reproducing light is shifted from a center of a recording track by an amount which is more than $0.02\times(\lambda/NA)$ but less than TP/4.

This makes it possible to equalize (i) a crosstalk amount with respect to a track inwardly adjacent to a target track on the optical information recording medium with (ii) a crosstalk amount with respect to a track outwardly adjacent to the target track on the optical information recording medium, during the reproduction of the optical information recording medium. This further improves track density, thereby making it possible to provide a reproducing device for an optical information recording medium having a high density.

In a reproducing method of reproducing the optical information recording medium according to the present invention, a reproduction is carried out such that a center of reproducing light is shifted from a center of a recording track by an amount which is more than $0.02\times(\lambda/NA)$ but less than TP/4.

This makes it possible to equalize (i) a crosstalk amount with respect to a track inwardly adjacent to a target track on the optical information recording medium with (ii) a crosstalk amount with respect to a track outwardly adjacent to the target track on the optical information recording medium, during the reproduction of the optical information recording medium. This further improves track density, thereby making it possible to provide a reproducing method for an optical information recording medium having a high density.

INDUSTRIAL APPLICABILITY

The present invention is applicable to an optical information recording medium from which information is reproduced in response to laser light. In addition to the optical information recording medium, the present invention is applicable to a reproduction of a high-density recording medium, to a reproducing device for the high-density recording medium, and to a reproducing method for the high-density recording medium.

The invention claimed is:

1. A read-only optical information recording medium in which information has been recorded and from which the information is reproduced in response to reproducing light irradiated onto a prepit provided in the optical information recording medium, the optical information recording medium, comprising:
   a light-transmitting layer or a transparent substrate;
   an information recording layer; and
   a substrate;
   wherein the light-transmitting layer or the transparent substrate, the information recording layer, and the substrate are stacked in this order from a side from which the reproducing light enters,
   wherein the information recording layer including at least a reproducing film whose complex refractive index at a light source wavelength λ of the reproducing light is changed by heat allows a track pitch satisfied by the relationship: $0.67\times(\lambda/NA) > TP > 0.04\times(\lambda/NA)$, and
   wherein TP is a track pitch of a recording track formed by a string of prepits provided on the substrate and NA is a numerical aperture of an objective lens for converging the reproducing light onto the optical information recording medium.

2. A read-only optical information recording medium in which information has been recorded and from which the information is reproduced in response to reproducing light irradiated onto a prepit provided in the optical information recording medium, the optical information recording medium, comprising:

a light-transmitting layer or a transparent substrate;
an information recording layer; and
a substrate,
wherein the light-transmitting layer or the transparent substrate, the information recording layer, and the substrate are stacked in this order from a side from which the reproducing light enters,
wherein the information recording layer including at least a reproducing film mainly made of a metal oxide whose complex refractive index at a light source wavelength $\lambda$ of the reproducing light is changed by heat allows a track pitch satisfied by the relationship: $0.67 \times (\lambda/NA) > TP > 0.04 \times (\lambda/NA)$, and
wherein TP is a track pitch of a recording track formed by a string of prepits provided on the substrate and NA is a numerical aperture of an objective lens for converging the reproducing light on the optical information recording medium.

3. The optical information recording medium as set forth in claim 1 or 2, wherein the reproducing film comprises zinc oxide.

4. A reproducing device for reproducing an optical information recording medium as set forth in claim 1 or 2, comprising:
means for carrying out a reproduction such that a center of the reproducing light is shifted from a center of a recording track by an amount which is more than $0.02 \times (\lambda/NA)$ but less than TP/4.

5. A reproducing method of reproducing an optical information recording medium as set forth in claim 1 or 2, wherein a reproduction is carried out such that a center of reproducing light is shifted from a center of a recording track by an amount which is more than $0.02 \times (\lambda/NA)$ but less than TP/4.

* * * * *